(12) United States Patent
Stewart (10) Patent No.: US 7,178,398 B2
(45) Date of Patent: Feb. 20, 2007

(54) COPLANAR PROOFMASSES EMPLOYABLE TO SENSE ACCELERATION ALONG THREE AXES

(75) Inventor: Robert E. Stewart, Woodland Hills, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 39 days.

(21) Appl. No.: 11/010,588

(22) Filed: Dec. 13, 2004

(65) Prior Publication Data

US 2005/0145029 A1    Jul. 7, 2005

Related U.S. Application Data

(60) Provisional application No. 60/534,948, filed on Jan. 7, 2004.

(51) Int. Cl.
*G01P 15/00* (2006.01)
(52) U.S. Cl. .................................. 73/514.01
(58) Field of Classification Search ................ 73/514.21–514.24, 514.36–514.38, 514.32, 73/514.19
See application file for complete search history.

(56) References Cited

U.S. PATENT DOCUMENTS

| 4,679,434 | A | * | 7/1987 | Stewart | 73/514.18 |
|---|---|---|---|---|---|
| 4,825,335 | A | * | 4/1989 | Wilner | 361/283.3 |
| 4,919,993 | A | * | 4/1990 | Woodruff | 428/134 |
| 4,920,801 | A | * | 5/1990 | Church | 73/514.16 |
| 4,928,203 | A | * | 5/1990 | Swindal et al. | 73/514.13 |
| 5,908,986 | A | * | 6/1999 | Mitamura | 73/504.12 |
| 6,122,965 | A | * | 9/2000 | Seidel et al. | 73/514.36 |
| 6,829,937 | B2 | * | 12/2004 | Mahon | 73/514.29 |
| 2003/0230143 | A1 | * | 12/2003 | Mahon | 73/514.29 |
| 2006/0021436 | A1 | * | 2/2006 | Kapser et al. | 73/514.38 |

FOREIGN PATENT DOCUMENTS

EP    274201 A1 *    7/1988

* cited by examiner

*Primary Examiner*—Hezron Williams
*Assistant Examiner*—Tamiko Bellamy
(74) *Attorney, Agent, or Firm*—Carmen B. Patti & Assoc., LLC (57) ABSTRACT

An apparatus in one example comprises a first proofmass employable to sense a first acceleration along a first input axis; a second proofmass employable to sense a second acceleration along a second input axis; and a third proofmass employable to sense a third acceleration along a third input axis. The first input axis, the second input axis, and the third input axis are substantially orthogonal. The first proofmass, the second proofmass, and the third proofmass are substantially coplanar.

21 Claims, 6 Drawing Sheets

COPLANAR PROOFMASSES EMPLOYABLE TO SENSE ACCELERATION ALONG THREE AXES

CROSS-REFERENCE TO RELATED APPLICATION

This application claims the priority of U.S. provisional Patent Application Ser. No. 60/534,948 (by Robert E. Stewart, filed Jan. 7, 2004, and entitled "COPLANAR PROOFMASSES EMPLOYABLE TO SENSE ACCELERATION ALONG THREE AXES").

TECHNICAL FIELD

The invention relates generally to electromechanical systems and more particularly to electromechanical acceleration sensors.

BACKGROUND

An electromechanical system in one example measures a parameter. The electromechanical system may comprise a micro-electromechanical system ("MEMS") accelerometer or gyroscope that measures the parameter. For example, the accelerometer measures an acceleration and the gyroscope measures a rotation. The accelerometer in one example comprises a proofmass sensor component supported at a flexure point by a frame. The flexure point is compliant to allow movement of the proofmass upon occurrence of an acceleration. Pickoff and processing components measure and translate the movement of the proofmass into a direction and magnitude of the acceleration.

A proofmass is employable to sense an acceleration in one direction. For a more complete analysis of the acceleration, three proofmasses are used in combination. For example, a first proofmass is oriented to sense acceleration along a first direction (e.g., x-axis), a second proofmass is oriented to sense acceleration along a second direction (e.g., y-axis), and a third proofmass is oriented to sense acceleration along a third direction (e.g., z-axis). The three directions in one example are orthogonal. The three proofmasses are arranged in a triad to determine an accurate direction and magnitude of the acceleration.

In one example, the first proofmass is attached to a first face of a cube, the second proofmass is attached to a second face of the cube, and the third proofmass is attached to a third face of the cube. Sensitive axes (i.e., input axes) of the proofmasses are orthogonal to the mounting surface of the cube. Thus, the cube with the three proofmasses is employable to measure acceleration in any direction by combining the measurement from the three proofmasses. As one shortcoming, the size of the accelerometer is large due to the requirement to orient three proofmasses in three different planes. As another shortcoming, it is costly to interconnect the three proofmasses in the three different planes. As yet another example, since the three proofmasses are oriented in the three different planes, the proofmasses may not have limit stops to prevent damage during high accelerations in some directions.

In another example, the three proofmasses are coplanar. Flexure components that connect the proofmass with the frame may be too compliant allowing excessive out of plane movement. As one shortcoming, the excessive out of plane movement causes non-linearity performance errors in the acceleration measurement. The sensitive axes of the three proofmasses in one example do not intersect at a common point. The processing component that calculates the acceleration must employ compensation algorithms that account for the fact that the sensitive axes of the three proofmasses do not intersect at a common point. As another shortcoming, the compensation algorithms complicate the acceleration calculation process.

Thus, a need exists for an electromechanical system that comprises three coplanar proofmasses employable to sense acceleration along three axes. A further need exists for the electromechanical system to prevent non-linearity performance errors in acceleration measurement. Yet a further need exists for the electromechanical system to promote a reduction in computational complexity of compensation algorithms that calculate the acceleration sensed by the electromechanical system.

SUMMARY

The invention in one embodiment encompasses an apparatus. The apparatus comprises a first proofmass employable to sense a first acceleration along a first input axis; a second proofmass employable to sense a second acceleration along a second input axis; and a third proofmass employable to sense a third acceleration along a third input axis. The first input axis, the second input axis, and the third input axis are substantially orthogonal. The first proofmass, the second proofmass, and the third proofmass are substantially coplanar.

The invention in another embodiment encompasses a process. Three coplanar proofmasses are etched into a substrate. The three coplanar proofmasses are employable to sense acceleration along three respective input axes. One or more voids are etched into the three coplanar proofmasses to orient the three respective input axes into three orthogonal acceleration sensing directions.

The invention in yet another embodiment encompasses an apparatus. The apparatus comprises a first proofmass employable to sense a first acceleration along a first input axis, a second proofmass employable to sense a second acceleration along a second input axis, and a third proofmass employable to sense a third acceleration along a third input axis. The first proofmass, the second proofmass, and the third proofmass are substantially coplanar. The first input axis, the second input axis, and the third input axis intersect at a common point and are substantially orthogonal.

The invention in still another embodiment encompasses an apparatus. The apparatus comprises a first proofmass employable to sense a first acceleration along a first input axis, a second proofmass employable to sense a second acceleration along a second input axis, a third proofmass employable to sense a third acceleration along a third input axis, and a plurality of cross-leaf flexures that couple the first proofmass, the second proofmass, and the third proofmass with a frame. The first proofmass, the second proofmass, and the third proofmass are substantially coplanar.

DESCRIPTION OF THE DRAWINGS

Features of exemplary implementations of the invention will become apparent from the description, the claims, and the accompanying drawings in which:

DETAILED DESCRIPTION

Figure 1:
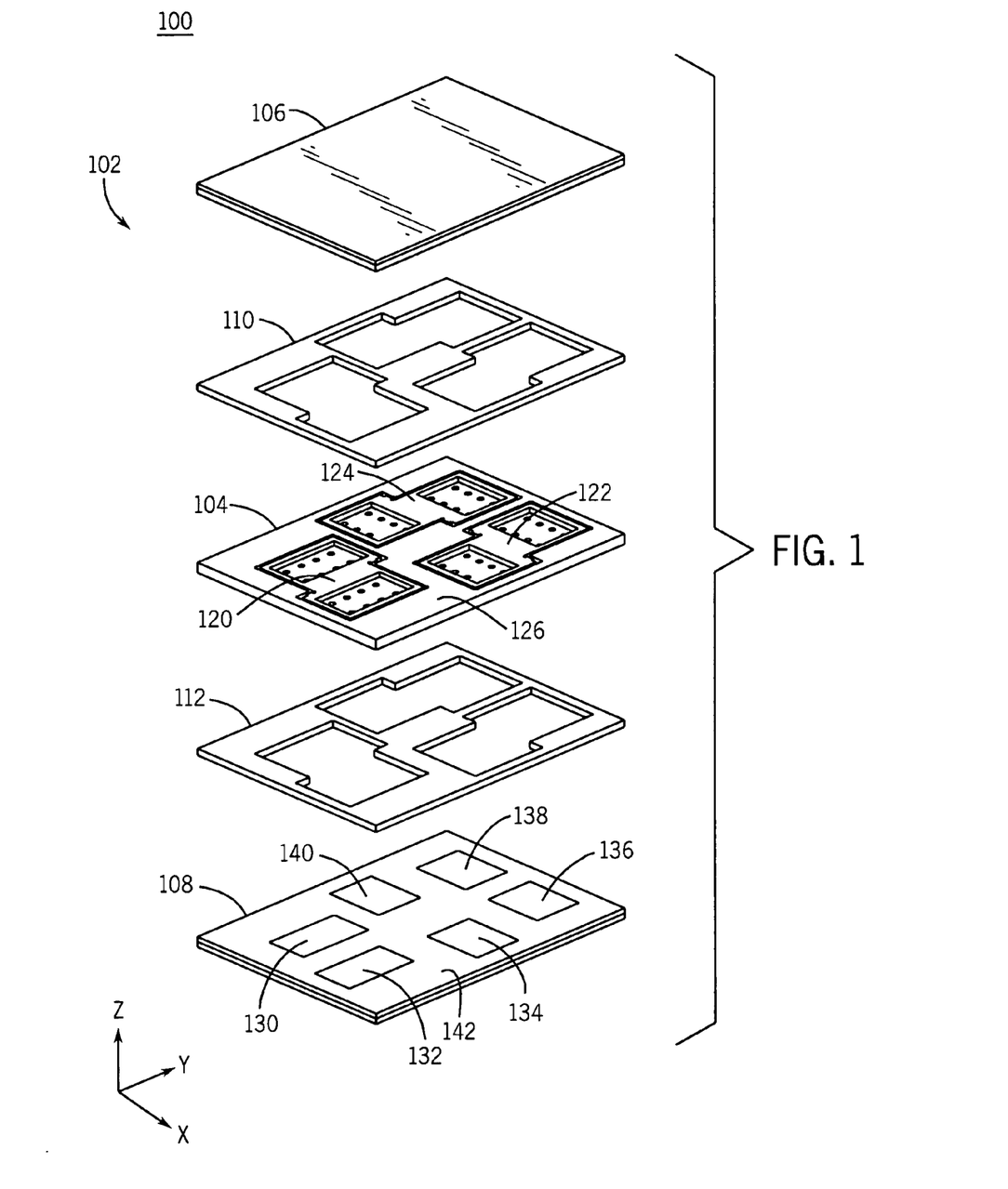
FIG. 1 is an exploded view of an exemplary implementation of an apparatus that comprises a micro-electromechanical system triaxial planar accelerometer sensor chip.

Turning to FIG. 1, an apparatus 100 in one example comprises a micro-electromechanical system ("MEMS") accelerometer. The accelerometer is employable for high accuracy navigation acceleration sensing. The apparatus 100 comprises a plurality of silicon layers. For example, the plurality of silicon layers may comprise one or more single crystal silicon layers and one or more silicon dioxide dielectric layers. A MEMS triaxial planar accelerometer sensor chip 102 comprises the plurality of silicon layers. The plurality of silicon layers in one example comprise a center element 104, a top cover 106, a bottom cover 108, and dielectric layers 110 and 112.

Figure 2:
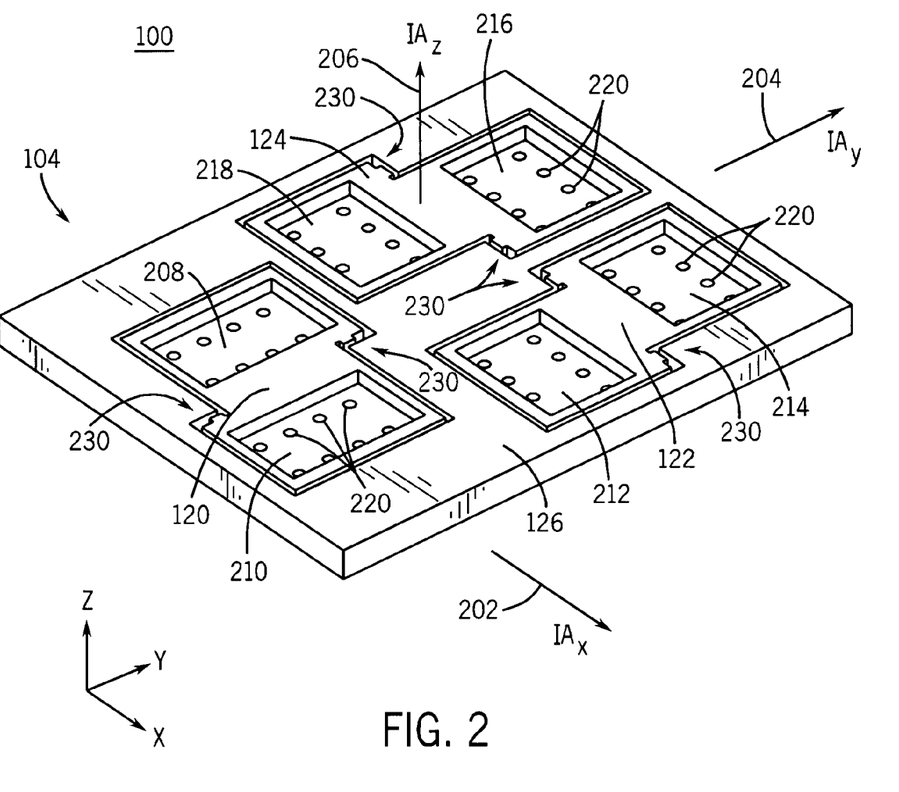
FIG. 2 is a representation of a center element of the micro-electromechanical system triaxial planar accelerometer sensor chip of the apparatus of FIG. 1.

Referring to FIG. 2, the center element 104 in one example comprises three proofmasses 120, 122, and 124 and a frame 126. For example, the proofmasses 120, 122, and 124 comprise pendulous sensor components. The three proofmasses 120, 122, and 124 are substantially similar and can be operated from a common multiplexed electronic rebalance circuit. The proofmasses 120, 122, and 124 are substantially coplanar. For example, the proofmasses 120, 122, and 124 may be etched from a single crystal silicon layer so that the frame 126 supports the proofmasses 120, 122, and 124 at flexure points. In another example, the three proofmasses 120, 122, and 124 are formed from separate silicon layers and then oriented to be coplanar. The three proof asses 120, 122, and 124 can lay in the same plane while the pendulous and input axes of the proofmasses 120, 122, and 124 can be oriented to form an orthogonal coordinate frame. With all three proofmasses 120, 122, and 124 laying in the same plane it is possible to fabricate them in a single substrate. The proofmass 120 is employable to sense acceleration along a first input axis 202 (e.g., x-axis), the proofmass 122 is employable to sense acceleration along a second input axis 204 (e.g., y-axis), and the proofmass 124 is employable to sense acceleration along a third input axis 206 (e.g., z-axis). The input axes 202, 204, and 206 are substantially orthogonal.

The proofmasses 120, 122, and 124 in one example are arranged in a seesaw configuration. For example, a middle portion of the proofmasses 120, 122, and 124 are supported and the end portions are able to move in a seesaw motion in response to an acceleration. The seesaw configuration provides the ability to design for different acceleration ranges with a common thickness of the proofmasses 120, 122, and 124 and batch fabricate the proofmasses 120, 122, and 124 as a single triad using MEMS silicon micro-machining technology. For example, the ability to design for different acceleration ranges is advantageous in implementations where axial accelerations and cross-axis accelerations vary. The seesaw configuration provides the ability to design proofmasses 120, 122, and 124 with a higher thickness which allows the use of larger diameter silicon wafers resulting in more die per wafer and lower per chip cost. The planar configuration of the proofmasses 120, 122, and 124 also promotes a reduction in a number of interconnections between the MEMS triaxial planar accelerometer sensor chip 102 (FIG. 1) and the system electronics by connecting common signal lines together at the chip level. The planar geometry of the seesaw configuration allows the MEMS triaxial planar accelerometer sensor chip 102 (FIG. 1) to be mounted in an orientation that allows the proofmasses 120, 122, and 124 to bottom out and limit the stress on the suspension. If the z-axis is aligned parallel to a high acceleration direction, then upon occurrence of a high acceleration the proofmasses 120, 122, and 124 will bottom out to prevent damage to the suspension.

Figure 3:
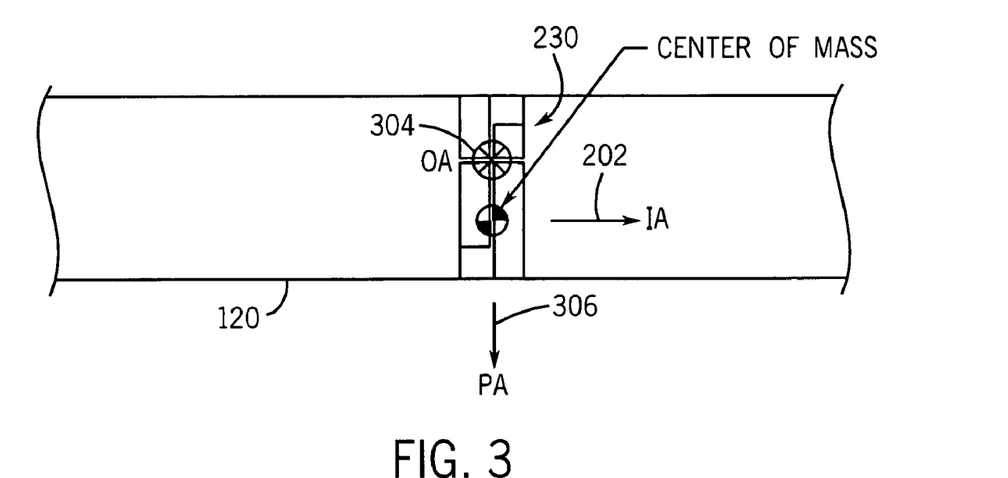
FIG. 3 is a representation of a cross-leaf flexure for a proofmass that senses an acceleration along the x-axis or y-axis for the micro-electromechanical system triaxial planar accelerometer sensor chip of the apparatus of FIG. 1.
Figure 4:
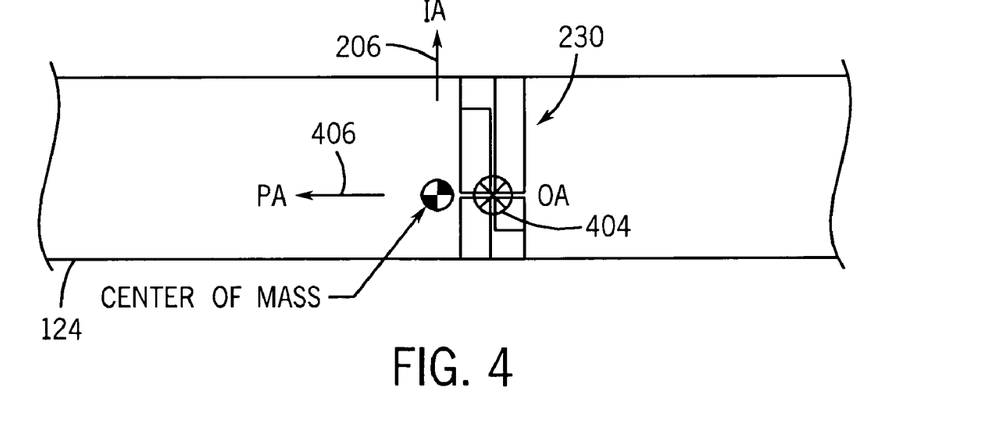
FIG. 4 is a representation of a cross-leaf flexure for a proofmass that senses an acceleration along the z-axis for the micro-electromechanical system triaxial planar accelerometer sensor chip of the apparatus of FIG. 1.

Referring to FIGS. 2–4, the proofmasses 120, 122, and 124 comprise one or more cavities 208, 210, 212, 214, 216, and 218 and one or more holes 220 etched at the bottom of the cavities 208, 210, 212, 214, 216, and 218. The holes 220 serve to reduce squeeze film gas damping and associated noise. The cavities 208, 210, 212, 214, 216, and 218 may be etched from a top surface of the proofmasses 120, 122, and 124. The cavities 208, 210, 212, 214, 216, and 218 serve to make the center of mass of the proofmasses 120, 122, and 124 closer to a bottom surface of the proofmasses 120, 122, and 124. For example, the center of mass is lower than the center of geometry. The cavities 208, 210, 212, 214, 216, and 218 serve to orient the input axes 202, 204, and 206. For example, the cavities 208, 210, 212, 214, 216, and 218 in the proofmasses 120, 122, and 124 adjust a position of the center of mass. The position of the center of mass orients the input axes 202, 204, and 206 to measure acceleration in three orthogonal directions.

Referring to FIGS. 2–3, cross-leaf flexures 230 couple the proofmasses 120, 122, and 124 with the frame 126. The cross-leaf flexures 230 allow the proofmasses 120, 122, and 124 to rotate about an axis of rotation. The axis of rotation passes through a flexure point in the cross-leaf flexure 230. The axis of rotation comprises an output axis ("OA") 304 for the proofmass 120. A pendulous axis ("PA") 306 is orthogonal to the output axis 304 and passes through the center of mass of the proofmass 120. The input axis 202 of the proofmass 120 passes through the center of mass of the proofmass 120 and is orthogonal to the plane that contains both the output axis 304 and the pendulous axis 306. Thus, the input axes 202 and 204 of the proofmasses 120 and 122 can be positioned by aligning the center of masses relative to the cross-leaf flexures 230. For example, the center of masses are aligned relative to the output axes 304 to position the input axes 202 and 204. Orienting the proofmasses 120 and 122 so that the input axes 202 and 204 are orthogonal allows the proofmasses 120 and 122 to sense acceleration in any in-plane direction.

Referring to FIGS. 2 and 4, to sense out-of-plane acceleration the center of mass of the proofmass 124 is positioned to orient the input axis 206 in the out-of-plane direction. For example, the input axis 206 is substantially orthogonal to the input axes 202 and 204. The input axis 206 can be positioned by aligning the center of mass of the proofmass 124 relative to the cross-leaf flexure 230. The position of the cavities 216 and 218 in the proofmass 124 aligns the center of mass of the proofmass 124 at a position offset to the side of an output axis 404 for the proofmass 124. A pendulous axis 406 for the proofmass 124 is orthogonal to the output axis 404 and passes through the center of mass of the proofmass 124. Thus, the pendulous axis 406 is in-plane and the input axis 206 is out-of-plane to measure an out-of-plane acceleration.

Figure 5:
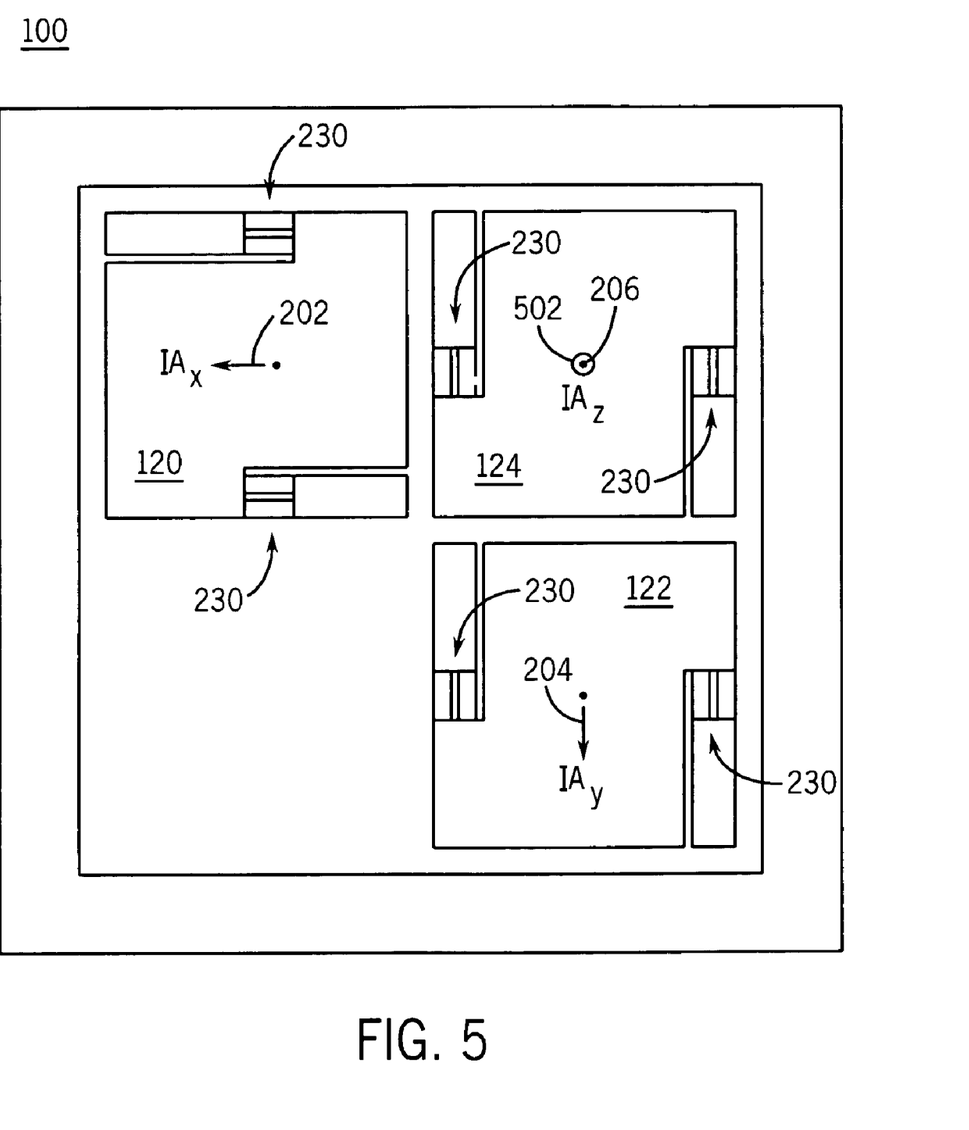
FIG. 5 is a representation of an intersection at a common point by three input axes of three proofmasses of the micro-electromechanical system triaxial planar accelerometer sensor chip of the apparatus of FIG. 1.

Referring to FIG. 5, the input axes 202, 204, and 206 in one example intersect at a common point 502 and are substantially orthogonal. For example, the orientation of the proofmass 124 may be chosen to place the input axis 206 at a location where the input axes 202 and 204 intersect. Orienting the input axes 202, 204, and 206 to intersect at the common point 502 serves to reduce a number of coefficients needed to compensate for the size effect in an inertial system. Compensation algorithms are employed to calculate the acceleration sensed by the proofmasses 120, 122, and 124. The compensation algorithms take into account the position of the input axes 202, 204, and 206. Since the input axes 202, 204, and 206 intersect at the common point 502, the compensation algorithms may be simplified.

Figure 6:
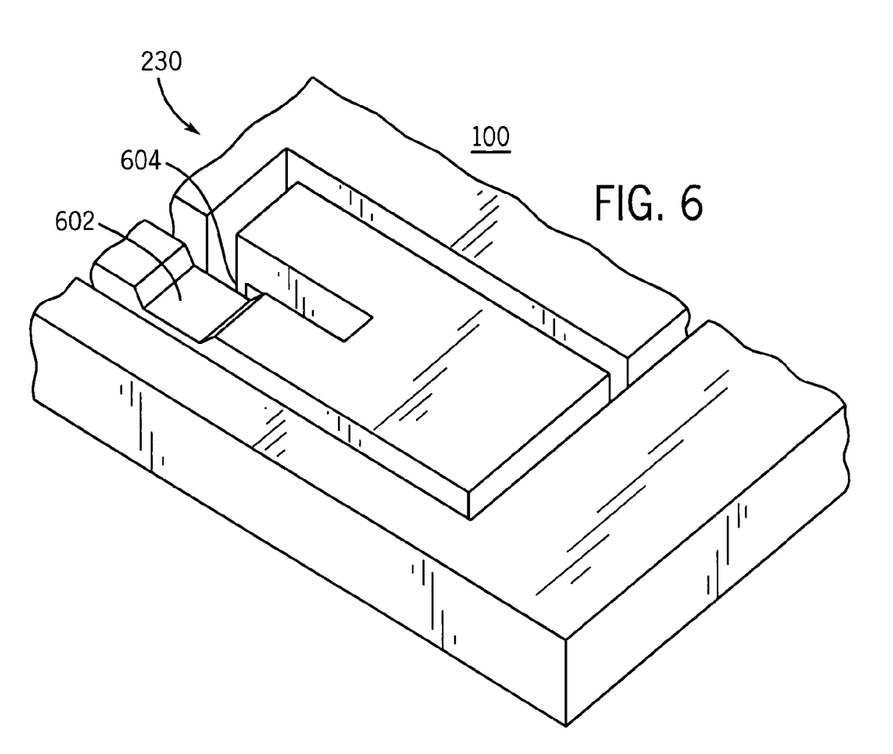
FIG. 6 is a representation of a cross-leaf flexure for a proofmass of the micro-electromechanical system triaxial planar accelerometer sensor chip of the apparatus of FIG. 1.

Referring to FIGS. 2 and 6, the proofmasses 120, 122, and 124 employ cross-leaf flexures 230 that couple the proofmasses 120, 122, and 124 with the frame 126. The cross-leaf flexures 230 comprise a first flexure component 602 and a second flexure component 604. The first flexure component 602 comprises a first flexure portion that is substantially parallel with the input axis 202. The second flexure component 604 comprises a second flexure portion that is substantially orthogonal to the input axis 202. The cross-leaf flexure 230 serves to prevent translation of the proofmasses 120, 122, and 124. Translation of the proofmasses 120, 122, and 124 causes scale factor non-linearity due to variation of the capacitor gap used for electrostatic forcing.

The second flexure component 604 serves to reduce the compliancy of the first flexure component 602 and the first flexure component 602 serves to reduce the compliancy of the second flexure component 604. The proofmasses 120, 122, and 124 lay substantially in a plane. The second flexure component 604 serves to promote a reduction in compliancy of the proofmasses 120, 122, and 124 in a direction out of the plane. The second flexure component 604 provides stiffness to the cross-leaf flexures 230 for accelerations orthogonal to the plane of the first flexure component 602. Thus, the second flexure component 604 serves to reduce hinge sag.

Figure 7:
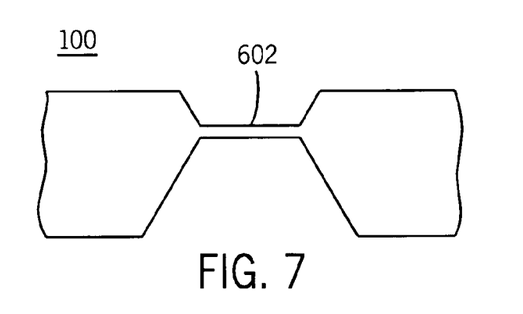
FIG. 7 is a representation of a first flexure portion of the cross-leaf flexure of the apparatus of FIG. 6.
Figure 8:
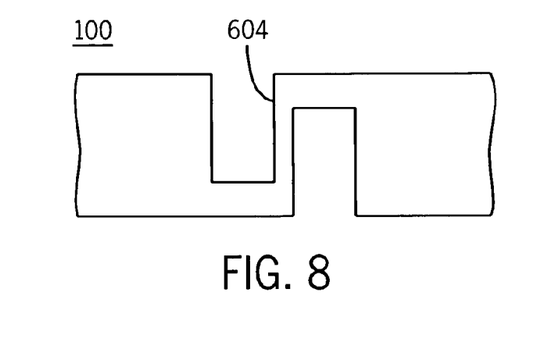
FIG. 8 is a representation of a second flexure portion of the cross-leaf flexure of the apparatus of FIG. 6.

Referring to FIGS. 2 and 7–8, the first flexure component 602 comprises a cantilever beam flexure that is substantially coplanar with the proofmasses 120, 122, and 124. The second flexure component 604 comprises the second flexure portion that is substantially orthogonal to the cantilever beam flexure. The second flexure component 604 promotes an increase in the stiffness of the cross-leaf flexures 230 to out-of-plane motion.

Referring to FIGS. 1 and 6, depending on performance requirements, the MEMS triaxial planar accelerometer sensor chip 102 can be operated in either open or closed loop. For open loop operation the cross-leaf flexures 230 are designed to have a spring constant that limits the rotational motion of the proofmasses 120, 122, and 124 such that the proofmasses 120, 122, and 124 do not touch electrodes 130, 132, 134, 136, 138, and 140 at the maximum acceleration range. For a higher dynamic range, an improved scale factor linearity, bias stability, and repeatability, the MEMS triaxial planar accelerometer sensor chip 102 operates in a closed loop mode. In the closed loop mode, voltages are fed back to the electrodes 130, 132, 134, 136, 138, and 140 to develop electrostatic forces that maintain the pickoff at null. The electrostatic forcing method may be either voltage biased or charge control.

Referring to FIG. 1, the top cover 106 and bottom cover 108 serve to encapsulate the center element 104. The top cover 106 and the bottom cover 108 form a hermetically sealed sensor chip when bonded with the center element 104. Micro fabrication and bonding of the sensor chip is done at the wafer level. The bottom cover 108 is a silicon-on-insulator ("SOI") structure. An outer layer of the bottom cover 108 comprises a handle layer. An inner layer of the bottom cover 108 comprises a device layer. The device layer comprises a plurality of electrodes 130, 132, 134, 136, 138, and 140 and a guard ring 142. The device layer in one example comprises six isolated electrodes 130, 132, 134, 136, 138, and 140. Two of the electrodes 130, 132, 134, 136, 138, and 140 are associated with each of the proofmasses 120, 122, and 124.

The dielectric layer 110 establishes a gap between the top cover 106 and the center element 104. The dielectric layer 112 establishes a gap between the center element 104 and the bottom cover 108. For example, the dielectric layer 112 establishes the gap between the electrodes 130, 132, 134, 136, 138, and 140 and the proofmasses 120, 122, and 124. The electrodes 130, 132, 134, 136, 138, and 140 and the proofmasses 120, 122, and 124 form capacitive pickoff and forcer elements.

Force rebalance servo electronics apply charge to the electrodes 130, 132, 134, 136, 138, and 140 to sense the displacement of the proofmasses 120, 122, and 124 and maintain the displacement at null. The electrodes 130, 132, 134, 136, 138, and 140 in combination with the servo electronics sense the acceleration induced rotational motion of the proofmasses 120, 122, and 124 as a differential capacitance and apply a pulse width modulated electrostatic force to maintain the proofmasses 120, 122, and 124 at null. In one example, the output of the planar accelerometer triad is converted to a pulse train with a scale factor of approximately 100 KHz per G in the range of ±50 G. The individual accelerometer channels within the triad can be scaled to different G ranges up to 1000 G for specific applications.

Figure 9:
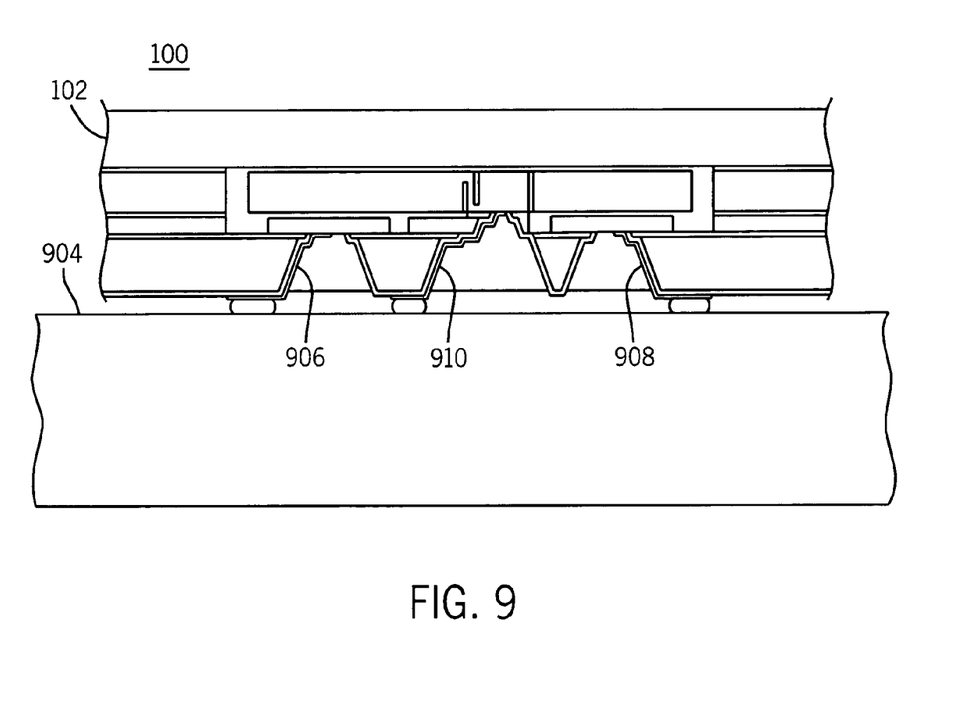
FIG. 9 is a representation of routing electrical signals from internal electrodes to the contact pads on the mounting surface of the micro-electromechanical system triaxial planar accelerometer sensor chip of the apparatus of FIG. 1.

Referring to FIGS. 1 and 9, the MEMS triaxial planar accelerometer sensor chip 102 in one example routes electrical signals from the proofmasses 120, 122, and 124 and the electrodes 130, 132, 134, 136, 138, and 140 to contact pads on a mounting surface of the MEMS triaxial planar accelerometer sensor chip 102. The MEMS triaxial planar accelerometer sensor chip 102 in one example employs the contact pads (e.g., solder pads) for ball grid array or flip chip mounting to a substrate 904. Electrical contacts 906 and 908 in one example transfer electrical signals from two of the electrodes 130, 132, 134, 136, 138, and 140 to the contact pads. Electrical contact 910 in one example transfers electrical signals from one of the proofmasses 120, 122, and 124 to the contact pads.

The apparatus 100 in one example comprises a plurality of components such as hardware components. A number of such components can be combined or divided in one example of the apparatus 100. The apparatus 100 in one example comprises any (e.g., horizontal, oblique, or vertical) orientation, with the description and figures herein illustrating one exemplary orientation of the apparatus 100, for explanatory purposes.

The steps or operations described herein are just exemplary. There may be many variations to these steps or operations without departing from the spirit of the invention. For instance, the steps may be performed in a differing order, or steps may be added, deleted, or modified.

Although exemplary implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

What is claimed is:

1. An apparatus, comprising:
a first proofmass employable to sense a first acceleration along a first input axis;
a second proofmass employable to sense a second acceleration along a second input axis; and
a third proofmass employable to sense a third acceleration along a third input axis;
wherein the first input axis, the second input axis, and the third input axis are substantially orthogonal; and
wherein the first proofmass, the second proofmass, and the third proofmass are substantially coplanar; and
wherein each of the first proofmass, the second proofmass, and the third proofmass comprise one or more voids, a center of geometry, and a center of mass; and
wherein the one or more voids serve to position the center of mass below the center of geometry; and
wherein the one or more voids are positioned in the first proofmass, the second proofmass, and the third proofmass to orient the first input axis, the second input axis, and the third input axis into three substantially orthogonal directions; and
wherein the first proofmass, the second proofmass, and the third proofmass lie substantially in a plane; and
wherein the one or more voids in the first and second proofmasses orient the first and second input axes in an in-plane direction; and
wherein the first proofmass is positioned relative to the second proofmass in the plane to orient the first input axis to be orthogonal to the second input axis; and
wherein the one or more voids in the third proofmass serve to position the center of mass of the third proofmass below the center of geometry and to a side of an axis of rotation of the third proofmass to orient the third input axis into an out-of-plane direction orthogonal to the first and second input axes.

2. An apparatus, comprising:
a first proofmass employable to sense a first acceleration along a first input axis;
a second proofmass employable to sense a second acceleration along a second input axis; and
a third proofmass employable to sense a third acceleration along a third input axis;
wherein the first input axis, the second input axis, and the third input axis are substantially orthogonal; and
wherein the first proofmass, the second proofmass, and the third proofmass are substantially coplanar; and
wherein the first proofmass comprises a cross-leaf flexure that couples the first proofmass with a frame; and
wherein the cross-leaf flexure comprises a first flexure beam and a second flexure beam; and
wherein the first, second, and third proofmasses lie substantially in a plane, wherein the first flexure beam is substantially parallel with the plane, and wherein the second flexure beam is substantially orthogonal to the plane.

3. The apparatus of claim 2, wherein the second flexure beam serves to promote a reduction in compliancy of the cross-leaf flexure in a direction out of the plane.

4. The apparatus of claim 1, wherein the third proofmass is positioned relative to the first and second proofmasses so the first input axis, the second input axis, and the third input axis intersect at a common point to simplify compensation algorithms during calculation of one or more of the first acceleration, the second acceleration, and the third acceleration.

5. The apparatus of claim 1, wherein one or more of the first proofmass, the second proofmass, and/or the third proofmass comprise one or more holes that serve to reduce squeeze film gas damping and associated noise in a measurement of one or more of the first acceleration, the second acceleration, and/or the third acceleration.

6. The apparatus of claim 1, further comprising a top cover and a bottom cover;
wherein the first proofmass, the second proofmass, and the third proofmass are formed in a substrate layer;
wherein the substrate layer is encapsulated between the top and bottom covers, wherein the top and bottom covers comprise one or more electrodes aligned to sense displacement of the first, second, and third proofmasses, and return the displacement to null.

7. The apparatus of claim 6, further comprising one or more dielectric layers between the substrate layer and one or more of the top and bottom covers, wherein the one or more dielectric layers comprise openings that provide space for displacement of the first, second, and third proofmasses.

8. The apparatus of claim 6, further comprising one or more electrical paths;
wherein one or more of the top and bottom covers comprises an outer surface with one or more electrical contacts;
wherein the electrical paths route signals between the one or more electrical contacts and one or more of the first proofmass, the second proofmass, the third proofmass, and the one or more electrodes;
wherein the one or more electrical contacts serve to electrically and mechanically connect with a separate layer.

9. A process, comprising the steps of:
etching three coplanar proofmasses into a substrate, wherein the three coplanar proofmasses are employable to sense acceleration along three respective input axes;
etching one or more voids into the three coplanar proofmasses to orient the three respective input axes into three orthogonal acceleration sensing directions; and
forming one or more flexure components to support the three coplanar proofmasses, wherein the one or more flexure components comprise a first beam substantially parallel with a plane of the three proofmasses and a second beam substantially orthogonal to the plane to promote a reduction in compliancy of the one or more flexure components in a direction out of the plane.

10. The process of claim 9, wherein the step of etching the three coplanar proofmasses into the substrate comprises the steps of:
positioning the three proofmasses in the substrate so the three input axes are aligned in three orthogonal directions; and positioning the third proofmass relative to the first and second proofmasses so the three input axes intersect at a common point.

11. The process of claim 9, further comprising the step of:
etching one or more holes into one or more of the three coplanar proofmasses that serve to reduce squeeze film gas damping and associated noise in a measurement of the acceleration along the three respective input axes.

12. An apparatus, comprising:
a first proofmass employable to sense a first acceleration along a first input axis;
a second proofmass employable to sense a second acceleration along a second input axis; and
a third proofmass employable to sense a third acceleration along a third input axis;
wherein the first proofmass, the second proofmass, and the third proofmass are substantially coplanar; and
wherein the first input axis, the second input axis, and the third input axis intersect at a common point and are substantially orthogonal; and
wherein the first proofmass comprises a cross-leaf flexure that couples the first proofmass with a frame; and
wherein the cross-leaf flexure comprises a first flexure component and a second flexure component; and
wherein the first flexure component comprises a first flexure portion that is substantially parallel with the first input axis, wherein the second flexure component comprises a second flexure portion that is substantially orthogonal to the first flexure portion.

13. The apparatus of claim 12, wherein the first proofmass lays substantially in a plane;
wherein the second flexure portion of the second flexure component serves to promote a reduction in compliancy of the first proofmass in a direction out of the plane.

14. The apparatus of claim 12, wherein each of the first proofmass, the second proofmass, and the third proofmass comprise one or more voids, a center of geometry, and a center of mass; and
wherein the one or more voids position the center of mass below the center of geometry; and
wherein the first input axis, the second input axis, and the third input axis are oriented into orthogonal directions based on a placement of the one or more voids in the first proofmass, the second proofmass, and the third proofmass.

15. The apparatus of claim 12, wherein the third proofmass is positioned relative to the first proofmass and the second proofmass so the first input axis, the second input axis, and the third input axis intersect at a common point to simplify compensation algorithms during calculation of one or more of the first acceleration, the second acceleration, and the third acceleration.

16. An apparatus, comprising:
a first proofmass employable to sense a first acceleration along a first input axis;
a second proofmass employable to sense a second acceleration along a second input axis;
a third proofmass employable to sense a third acceleration along a third input axis; and
a plurality of cross-leaf flexures that couple the first proofmass, the second proofmass, and the third proofmass with a frame;
wherein the first proofmass, the second proofmass, and the third proofmass are substantially coplanar.

17. The apparatus of claim 2, wherein the third proofmass is positioned relative to the first and second proofmasses so the first input axis, the second input axis, and the third input axis intersect at a common point to simplify compensation algorithms during calculation of one or more of the first acceleration, the second acceleration, and the third acceleration.

18. The apparatus of claim 2, wherein one or more of the first proofmass, the second proofmass, and/or the third proofmass comprise one or more holes that serve to reduce squeeze film gas damping and associated noise in a measurement of one or more of the first acceleration, the second acceleration, and/or the third acceleration.

19. The apparatus of claim 2, further comprising a top cover and a bottom cover;
wherein the first proofmass, the second proofmass, and the third proofmass are formed in a substrate layer;
wherein the substrate layer is encapsulated between the top and bottom covers, wherein the top and bottom covers comprise one or more electrodes aligned to sense displacement of the first, second, and third proofmasses, and return the displacement to null.

20. The apparatus of claim 19, further comprising one or more dielectric layers between the substrate layer and one or more of the top and bottom covers, wherein the one or more dielectric layers comprise openings that provide space for displacement of the first, second, and third proofmasses.

21. The apparatus of claim 19, further comprising one or more electrical paths;
wherein one or more of the top and bottom covers comprises an outer surface with one or more electrical contacts;
wherein the electrical paths route signals between the one or more electrical contacts and one or more of the first proofmass, the second proofmass, the third proofmass, and the one or more electrodes;
wherein the one or more electrical contacts serve to electrically and mechanically connect with a separate layer.

* * * * *